(12) United States Patent
Chang (10) Patent No.: US 11,492,065 B1
(45) Date of Patent: Nov. 8, 2022

(54) TILTING TWO WHEEL FRONT FORK ASSEMBLY FOR A VEHICLE

(71) Applicant: Fu-Long Chang, Chiayi (TW)

(72) Inventor: Fu-Long Chang, Chiayi (TW)

( * ) Notice: Subject to any disclaimer, the term of this patent is extended or adjusted under 35 U.S.C. 154(b) by 0 days.

(21) Appl. No.: 17/736,438

(22) Filed: May 4, 2022

(30) Foreign Application Priority Data

Jun. 11, 2021 (CN) .......................... 202110656255.3

(51) Int. Cl.
  *B62K 25/24* (2006.01)
  *B62K 5/08* (2006.01)
  *B62K 5/00* (2013.01)

(52) U.S. Cl.
  CPC ................ *B62K 25/24* (2013.01); *B62K 5/08* (2013.01); *B62K 2005/001* (2013.01)

(58) Field of Classification Search
  CPC ..... B62K 25/24; B62K 5/08; B62K 2005/001
  See application file for complete search history.

(56) References Cited

U.S. PATENT DOCUMENTS

| | | | | |
|---|---|---|---|---|
| 4,351,410 | A * | 9/1982 | Townsend | B62D 61/065 |
| | | | | 280/5.509 |
| 4,375,293 | A * | 3/1983 | Solbes | B62K 5/10 |
| | | | | 280/22.1 |
| 2016/0152293 | A1 * | 6/2016 | Hirayama | B60G 3/20 |
| | | | | 280/124.103 |
| 2017/0259875 | A1 * | 9/2017 | Chang | B62K 5/05 |
| 2018/0281888 | A1 * | 10/2018 | Chang | B62K 5/05 |

FOREIGN PATENT DOCUMENTS

FR          2926783 A1 *   7/2009   ............... B62K 5/05

* cited by examiner

*Primary Examiner* — Darlene P Condra
(74) *Attorney, Agent, or Firm* — Muncy, Geissler, Olds & Lowe, P.C.

(57) ABSTRACT

A front fork assembly includes a shock absorbing assembly and an anti-revolving guiding member arranged in a front-rear direction and extending in an up-down direction to interconnect a suspending bracket and the connecting bridge, left and right connecting levers interconnecting a swing arm assembly and a crank pivoting shaft, and left and right cranks for mounting with two front wheels of a tilting vehicle. Occurrence of speed wobble of the front fork assembly is prevented to render driving of electric bicycles, scooters and motorcycles equipped with the front fork assembly better and safer, to shorten the braking distance of vehicles, to prevent spinning of vehicles during braking, to prevent side slip during turning, to provide more comfortable feeling of shock absorption of vehicles, and to render the driving stable when passing over obstacles.

10 Claims, 12 Drawing Sheets

TILTING TWO WHEEL FRONT FORK ASSEMBLY FOR A VEHICLE

CROSS-REFERENCE TO RELATED APPLICATION

This application claims priority of Chinese Patent Application No. 202110656255.3, filed on Jun. 11, 2021.

FIELD OF THE INVENTION

The disclosure relates to a front fork assembly of a vehicle with at least three wheels, and more particularly to a tilting two wheel front fork assembly for mounting with two front wheels.

BACKGROUND OF THE INVENTION

Speed wobble is a serious problem of a traditional high-speed vehicle, especially a motorcycle. Particularly, in case the front fork assembly of the aforementioned high-speed vehicle is equipped with two side-by-side shock absorbers, lateral sway of the front wheels is likely to occur due to different damping performances of two absorbers, and hence leads to speed wobble, loss of control and crash of the vehicle.

A frame mechanism of a vehicle disclosed in U.S. Ser. No. 10/112,672 has a steer handle used to drive two front wheels through two side-by-side arranged shock absorbers. Such side-by-side shock absorbers arrangement may introduce laterally different movements and forces to the steer handle and cause speed wobble happened onto the vehicle. Moreover, the lateral side-by-side shock absorbers arrangement on a front fork assembly brings some constraint that affects the span of two front wheels coming closer.

BRIEF SUMMARY OF THE INVENTION

Therefore, an object of the disclosure is to provide a front fork assembly of a two front wheeled tilting vehicle that can alleviate at least one of the drawbacks of the prior art.

According to the disclosure, the front fork assembly is for mounting with a left front wheel and a right front wheel, is pivotably connectable with a head tube of a vehicle frame, and is connectable with a steer handle. The front fork assembly includes an erect post, a suspending bracket, a shock absorbing assembly, am anti-revolving guiding member, a connecting bridge, a crank pivoting shaft, a left crank, a right crank, a swing arm assembly, a left connecting lever and a right connecting lever. The erect post is for pivotably inserting into the head tube, and has an upper end portion for connecting with the steer handle. The suspending bracket is securely connected with a lower end portion of the erect post. The shock absorbing assembly includes a cylinder and a cylinder rod. One of the cylinder and the cylinder rod has an upper end portion which is securely connected with the suspending bracket, and a lower end portion which is movably connected with the other one of the cylinder and the cylinder rod and reciprocally and coaxially slidable in the other one of the cylinder and the cylinder rod in an up-down direction. The anti-revolving guiding member has a fixed end which is connected to the suspending bracket, and a movable end which is disposed downwardly of the fixed end. The connecting bridge is connected with both the other one of the cylinder and the cylinder rod and the movable end of the anti-revolving guiding member for guiding the other one of the cylinder and the cylinder rod only to move axially relative to the one of the cylinder and the cylinder rod, and for restricting rotation of the cylinder relative to the cylinder rod. The crank pivoting shaft is disposed on the connecting bridge and extends in a left-right direction. The left crank and the right crank are respectively disposed at left and right sides of the shock absorbing assembly. Each of the left crank and the right crank has a pivot end which is pivotally connected to a related end of the crank pivoting shaft, a wheel mounting end which is connectable with a respective one of the left front wheel and the right front wheel, and a force pivoting point which is interposed between the pivot end and the wheel mounting end. The swing arm assembly includes a swing arm body which extends in the left-right direction. The swing arm body has a swiveling center axial portion which extends in the front-rear direction and is pivotably connected to the connecting bridge to be synchronously moved with the shock absorbing assembly in the up-down direction, and two swing end portions which are respectively disposed at left and right sides of the swiveling center axial portion. Upper ends of the left connecting lever and the right connecting lever are respectively and pivotally connected to the swing end portions. Lower ends of the left connecting lever and the right connecting lever are respectively and pivotally connected to the force pivoting points. Once one of the left front wheel and the right front wheel is subject to a force, the force is transmitted through the swing arm body and the left and right connecting levers to make even and balanced forces to the left and right front wheels, and the force is transmitted to the shock absorbing assembly through the swiveling center axial portion of the swing arm body.

BRIEF DESCRIPTION OF THE DRAWINGS

Other features and advantages of the disclosure will become apparent in the following detailed description of the embodiments with reference to the accompanying drawings, of which.

DETAILED DESCRIPTION OF THE INVENTION

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 5, a first embodiment of a front fork assembly 1 is adapted for mounting with a left front wheel 2 and a right front wheel 3, is pivotably connected with a head tube 41 of a conventional vehicle frame 4, and is connected with a steer handle 42 so as to be assembled as a tilting vehicle with at least three wheels. The front fork assembly 1 is steered by the steer handle 42 to transmit a steering force to the left front wheel 2 and the right front wheel 3.

The front fork assembly 1 includes an erect post 5, a suspending bracket 6, a crank pivoting shaft 7, a shock absorbing assembly 8 of a known type, an anti-revolving guiding member 9, a connecting bridge 10, a left crank 11, a right crank 12, a swing arm assembly 14, a left connecting lever 15 and a right connecting lever 16.

The erect post 5 is pivotably inserted into the head tube 41, and has an upper end portion for connecting with the steer handle 42. The suspending bracket 6 extends and is inclined rearwardly and upwardly, and is securely connected with a lower end portion of the erect post 5.

The shock absorbing assembly 8 extends and is inclined rearwardly and upwardly, and includes a cylinder 81 and a cylinder rod 82. The cylinder rod 82 has an upper end portion which is securely connected with the suspending bracket 6, and a lower end which is movably inserted into the cylinder 81 and reciprocally and coaxially slidable in the cylinder 81 in an up-down direction. The cylinder 81 is securely connected with the connecting bridge 10. It is noted that the cylinder and the cylinder rod may be alternatively disposed in an inversing manner. Specifically, the cylinder 81 may have an upper end portion which is securely connected with the suspending bracket 6, and a lower end portion which is movably sleeved on the cylinder rod 82 and reciprocally and coaxially slidable along the cylinder rod 82 in an up-down direction.

The anti-revolving guiding member 9 is in the form of a hinge, and includes a movable linkage 93 and a fixed linkage 94. The movable linkage 93 has a movable end 931 which is pivotably connected with the connecting bridge 10 about a left-right axis, and a joint end 932 which is disposed opposite to and upwardly of the movable end 931. The fixed linkage 94 has a fixed end 941 which is pivotably connected with a lower portion of the suspending bracket 6 about a left-right axis, and a joint end 942 which is pivotably connected with the joint end 932 of the movable linkage 93 about a left-right axis.

The connecting bridge 10 has a sleeve portion 101 which is fixed on and movable with the cylinder 81, a forward extending portion 102 which extends forwardly from a lower end of the sleeve portion 101 and through which the crank pivoting shaft 7 extends in a left-right direction, and a rearward extending portion 103 which extends rearwardly from an upper end of the sleeve portion 101 and which is pivotably connected with the movable end 931 of the movable linkage 93. The connecting bridge 10 cooperates with the anti-revolving guiding member 9 to guide the cylinder 81 only to move axially relative to cylinder rod 82 and not to rotate relatively to the cylinder rod 82.

The crank pivoting shaft 7 is disposed on the forward extending portion 102 of the connecting bridge 10 and extends in the left-right direction. The left crank 11 and the right crank 12 are respectively disposed at left and right sides of the shock absorbing assembly 8. Each of the left crank 11 and the right crank 12 has a front pivot end which is pivotably connected to a respective one of left and right ends of the crank pivoting shaft 7, a rear wheel mounting end which is connectable with a respective one of the left front wheel 2 and the right front wheel 3, and a force pivoting point 13 which is interposed between the front pivot end and the rear wheel mounting end and which is distant from the crank pivoting shaft 7 by an appropriate distance.

With such a configuration of the shock absorbing assembly 8, the crank pivoting shaft 7, the anti-revolving guiding member 9, the connecting bridge 10, the left crank 11 and the right crank 12 and the crank pivoting shaft 7 are movable synchronously through driving of the connecting bridge 10.

The swing arm assembly 14 is securely mounted on the connecting bridge 10 and bound to be moved synchronously with the cylinder 81 of the shock absorbing assembly 8 only in the up-down direction under guiding of the connecting bridge 10. The swing arm assembly 14 includes a support bracket 141 which is securely mounted on the rearward extending portion 103 of the connecting bridge 10, and a swing arm body 142 which extends in the left-right direction. The swing arm body 142 has a swiveling center axial portion 143 which extends in a front-rear direction and is pivotably mounted on the support bracket 141 such that the swing arm body 142 is freely swingable about the swiveling center axial portion 143 relative to the connecting bridge 10. The swing arm body 142 further has two symmetric swing end portions 144 which are respectively disposed at left and right sides of the swiveling center axial portion 143. Each of the swing end portions 144 has a swing pivot point 145 at a terminal end thereof.

Upper ends of the left connecting lever 15 and the right connecting lever 16 are respectively and pivotably connected to the swing pivot points 145 of the swing arm body 142. Lower ends of the left connecting lever 15 and the right connecting lever 16 are respectively and pivotably connected to the force pivoting points 13 of the left crank 11 and the right crank 12.

For example, once the left front wheel 2 is subject to a force to move up, the force is transmitted through the left connecting lever 15, by taking the crank pivoting shaft 7 as a fulcrum and the force pivoting point 13 as a force-output point, to the swing end portion 144 of the swing arm body 142. Then, with the equal-length swing end portions 144 of the swing arm body 142, the force and displacement of the left front wheel 2 is further equally transmitted to the right connecting lever 16 and the right crank 12 and then to the right front wheel 3 so as to make the reacting forces and moving displacements of two front wheels 2, 3 equal, to render ground-gripping forces of the two front wheels equal. Thus, riding on such a vehicle becomes more stable and safer. That is, when at least one of the left front wheel 2 and the right front wheel 3 is subject to a force, the force is transmitted for force compensation through the swing arm body 142 and the left and right connecting levers 15, 16 to make even and balanced forces to the left and right front wheels 2, 3, and the force is transmitted to the shock absorbing assembly 8 through the swiveling center axial portion 143 of the swing arm body 142 to cause compression of the shock absorbing assembly 8 for shock absorbing.

With the single shock absorbing assembly 8, the problem of two shock absorbers which generate interaction, interference and resonance therebetween is avoided, and occurrence of speed wobble of the front fork assembly 1 is prevented.

Moreover, with the single shock absorbing assembly 8, as compared with the frame mechanism of the prior art, the front fork assembly 1 of this disclosure provides an additional space to further reduce the center distance between the left front wheel 2 and the right front wheel 3 so as to meet the product design requirements of vehicles with narrower wheel-span requirements.

With reference to FIGS. 6, 7A, 8 and 9, in a second embodiment, the anti-revolving guiding member 9 includes a guiding cylinder 92 extending in the up-down direction, and a guiding rod 91 extending downwardly and coaxially and movably inserted into the guiding cylinder 92. The guiding cylinder 92 is secured to the rearward extending portion 103 of the connecting bridge 10. The guiding rod 91 has the upper fixed end 911 which is non-rotatably secured on the suspending bracket 6, and a lower end portion which is inserted into the guiding cylinder 92 and reciprocally and coaxially slidable in the guiding cylinder 92 in the up-down direction. An axis of the guiding rod 91 extends parallel to an axis of the cylinder rod 82 of the shock absorbing assembly 8, and is offset from the axis of the cylinder rod 82 in the front-rear direction.

The connecting bridge 10 is securely connected between the swing arm assembly 14 and the guiding cylinder 92 to rigidly interconnect the guiding cylinder 92, the cylinder 81 and the crank pivoting shaft 7 so as to synchronously move up and down. With the single shock absorbing assembly 8, occurrence of speed wobble of the front fork assembly 1 is prevented.

Furthermore, since the crank pivoting shaft 7 is synchronously movable with the shock absorbing assembly 8 in the up-down direction like the way of the first embodiment, the front fork assembly 1 of this embodiment also can be provided with any of a variety of the shock absorbing assemblies 8. Therefore, the overall performance, structural design flexibility and manufacturing costs of the front fork assembly 1 of the present disclosure are significantly improved.

Figure 1:
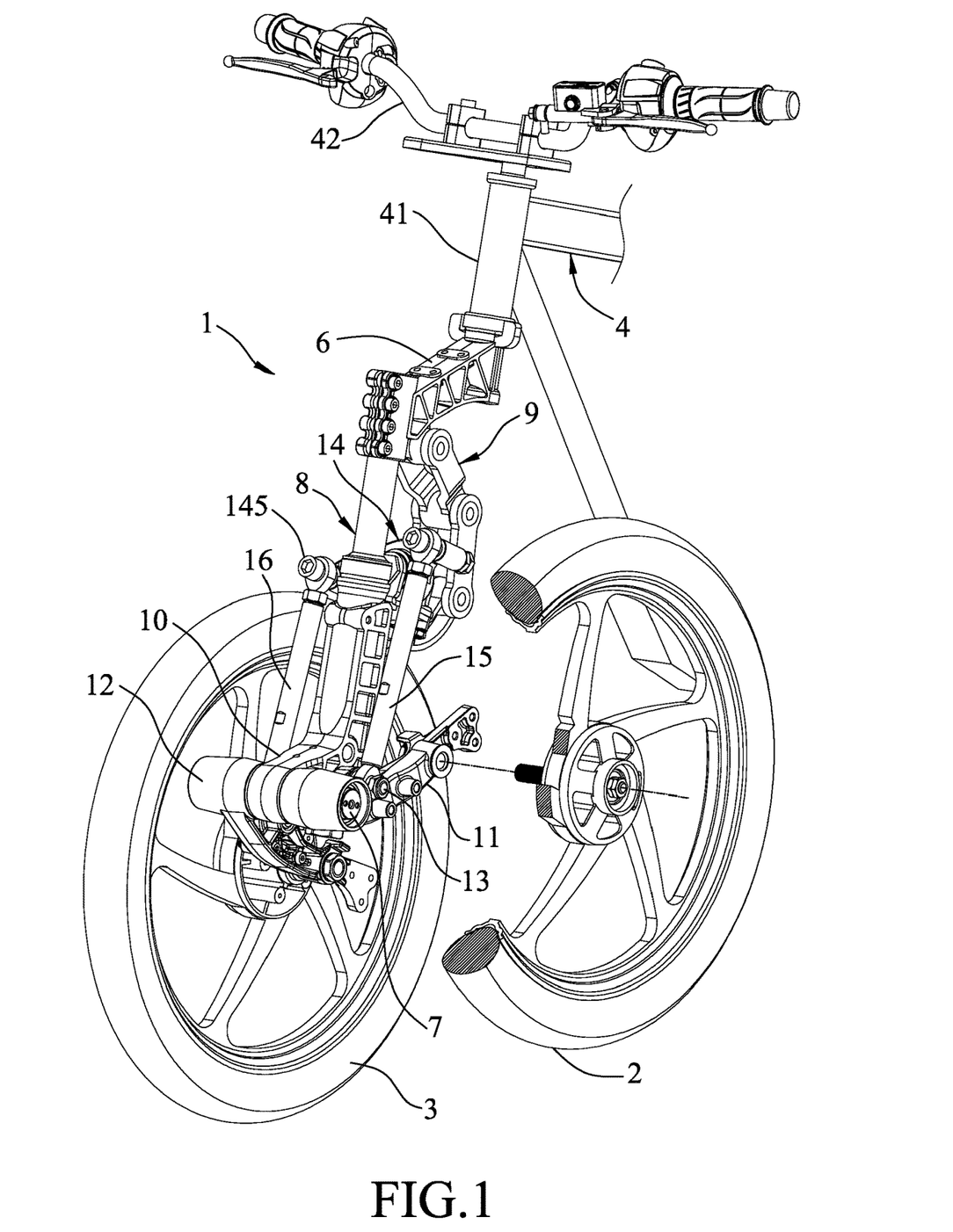
FIG. 1 is a fragmentary perspective view illustrating a first embodiment of a front fork assembly for a two front wheeled tilting vehicle according to the disclosure.
Figure 2:
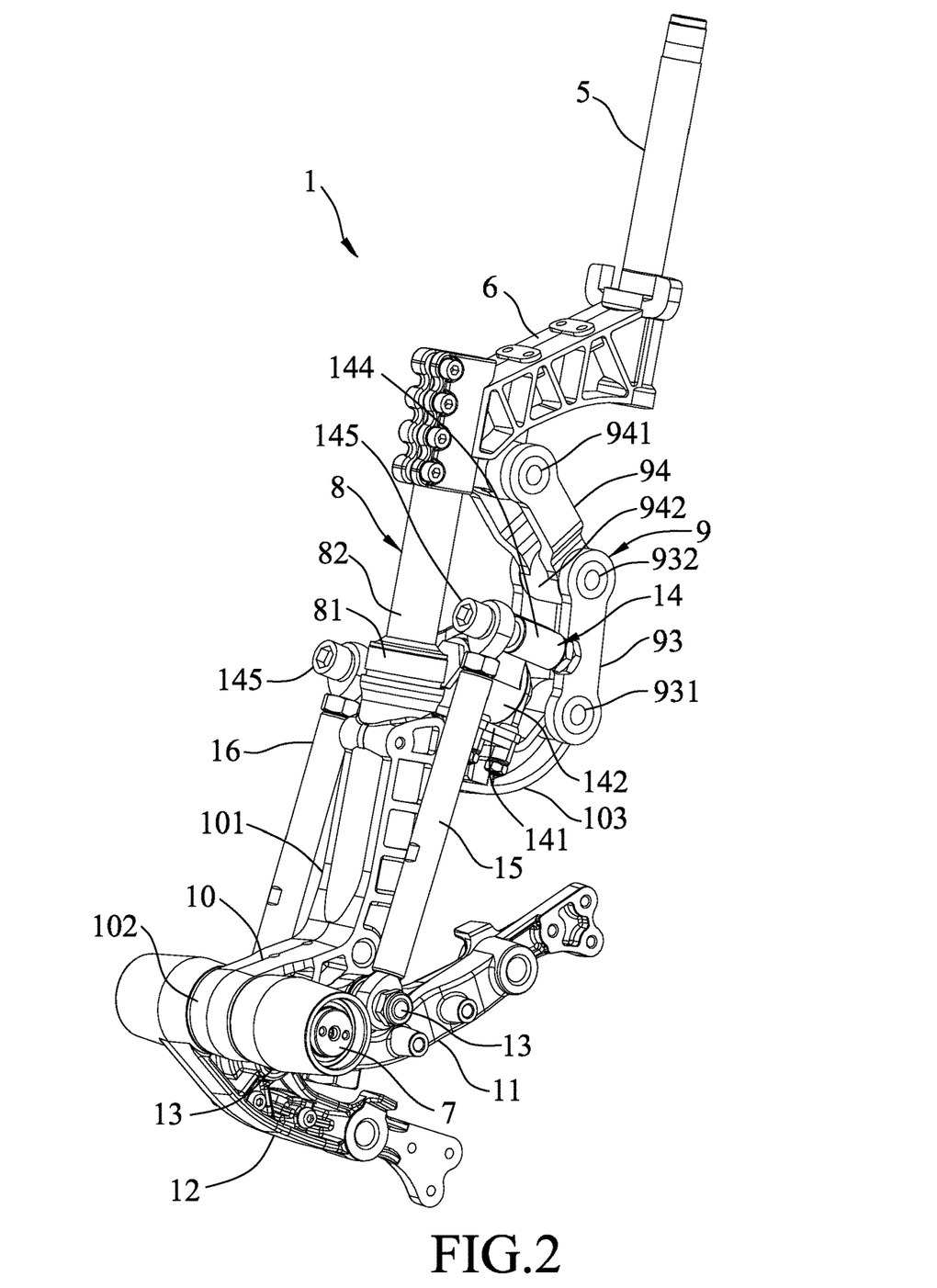
FIG. 2 is a perspective view of the first embodiment.
Figure 3:
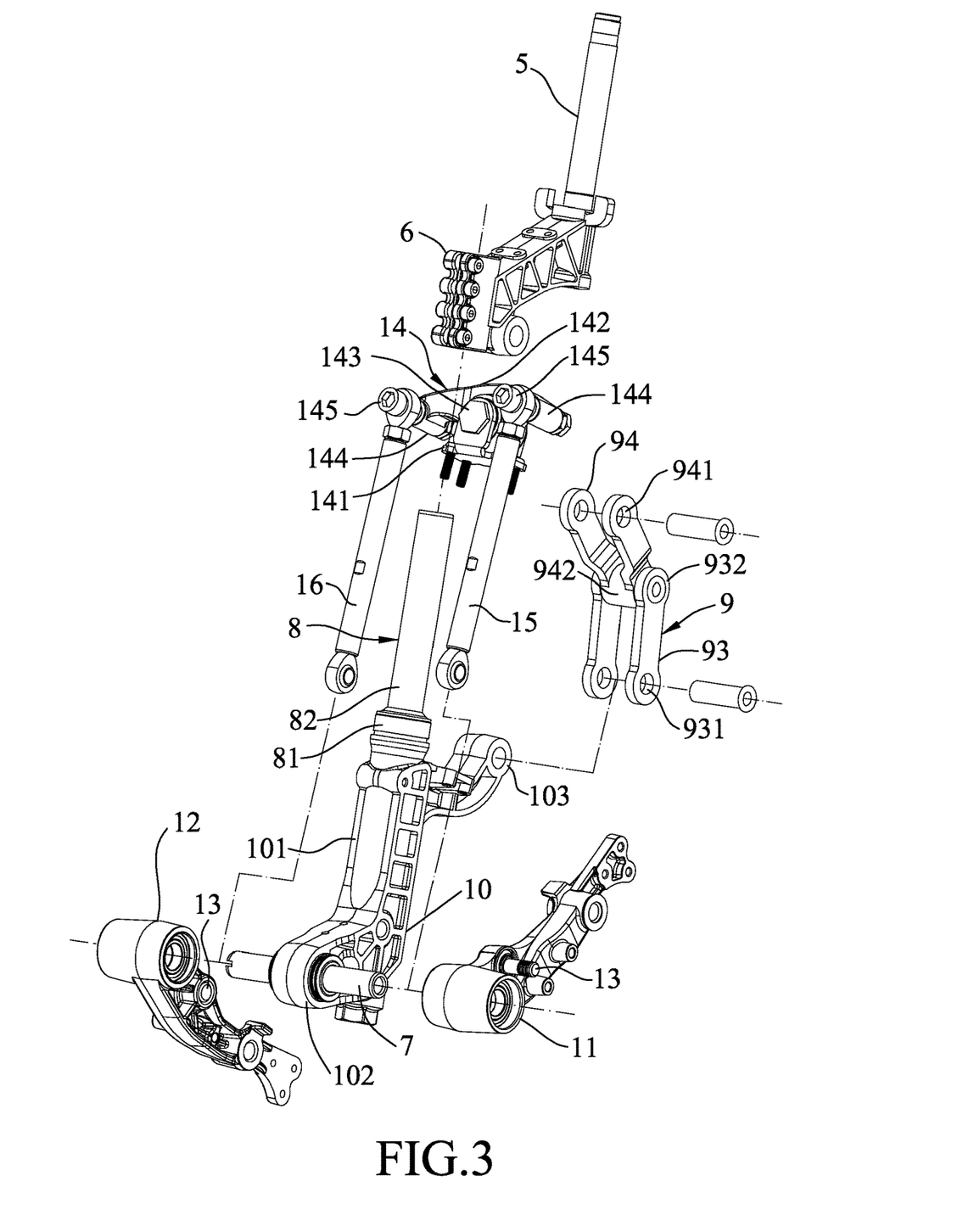
FIG. 3 is an exploded perspective view of the first embodiment.
Figure 4:
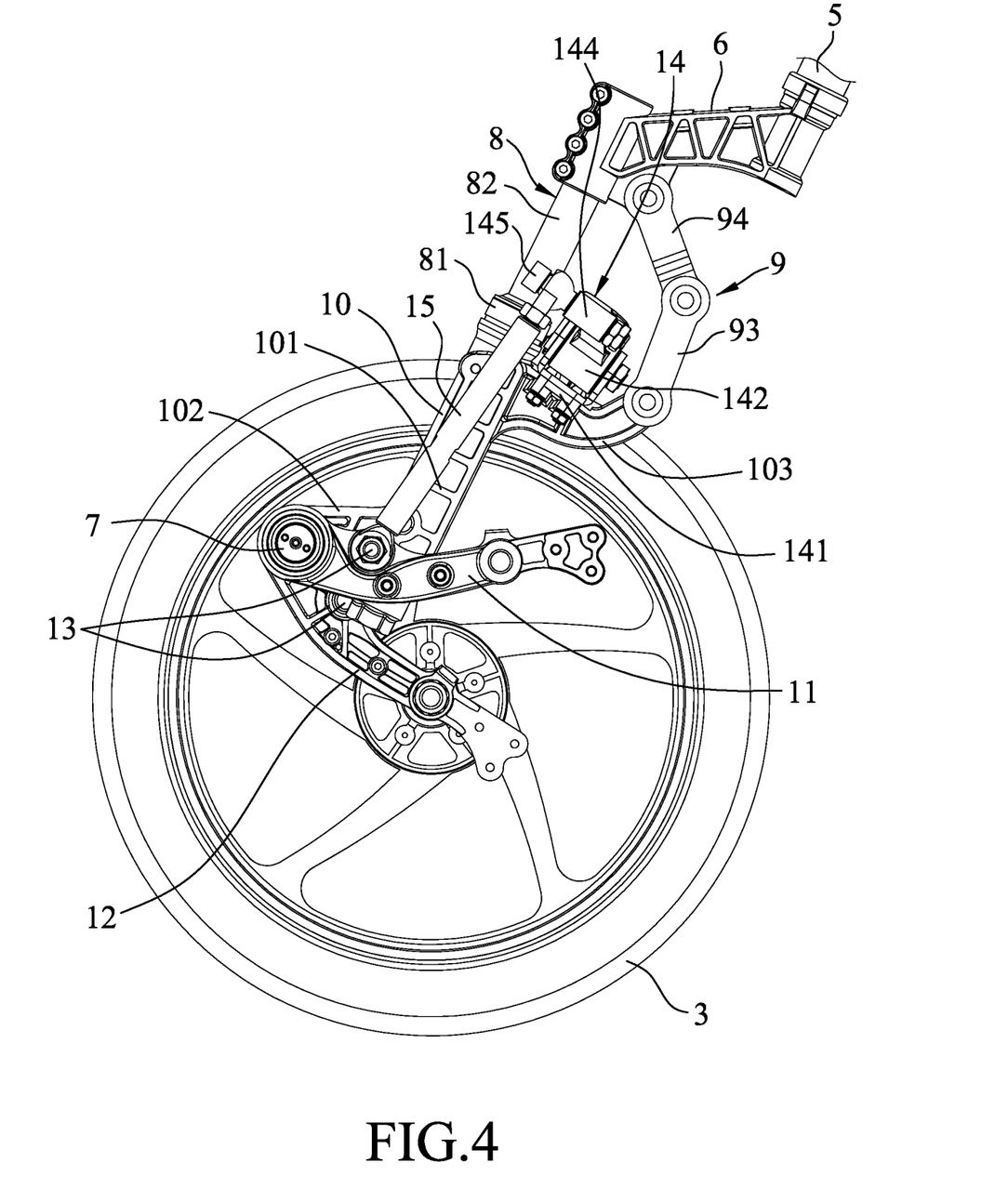
FIG. 4 is a fragmentary side view of the first embodiment.
Figure 5:
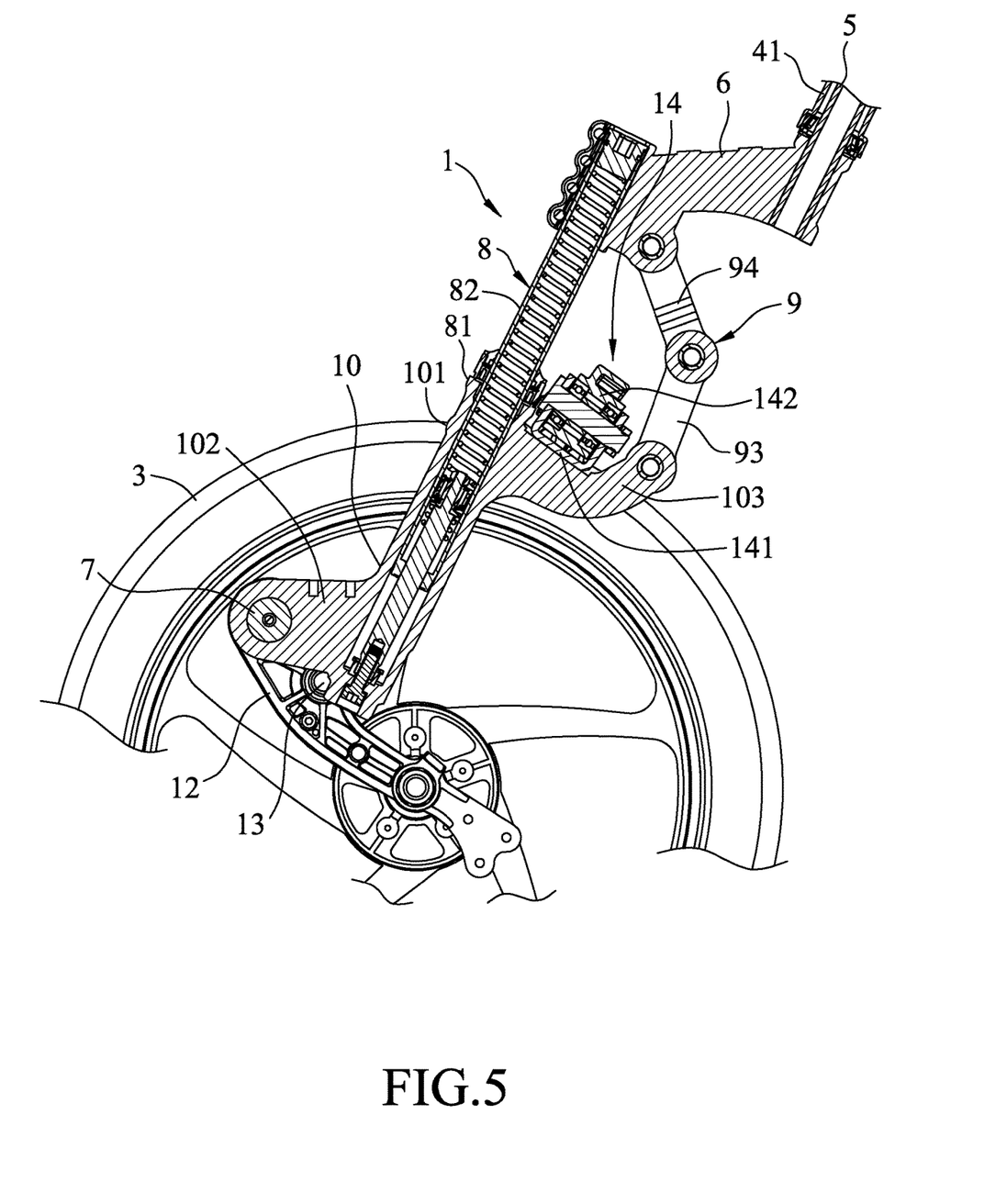
FIG. 5 is a fragmentary, partly sectional view of the first embodiment.
Figure 6:
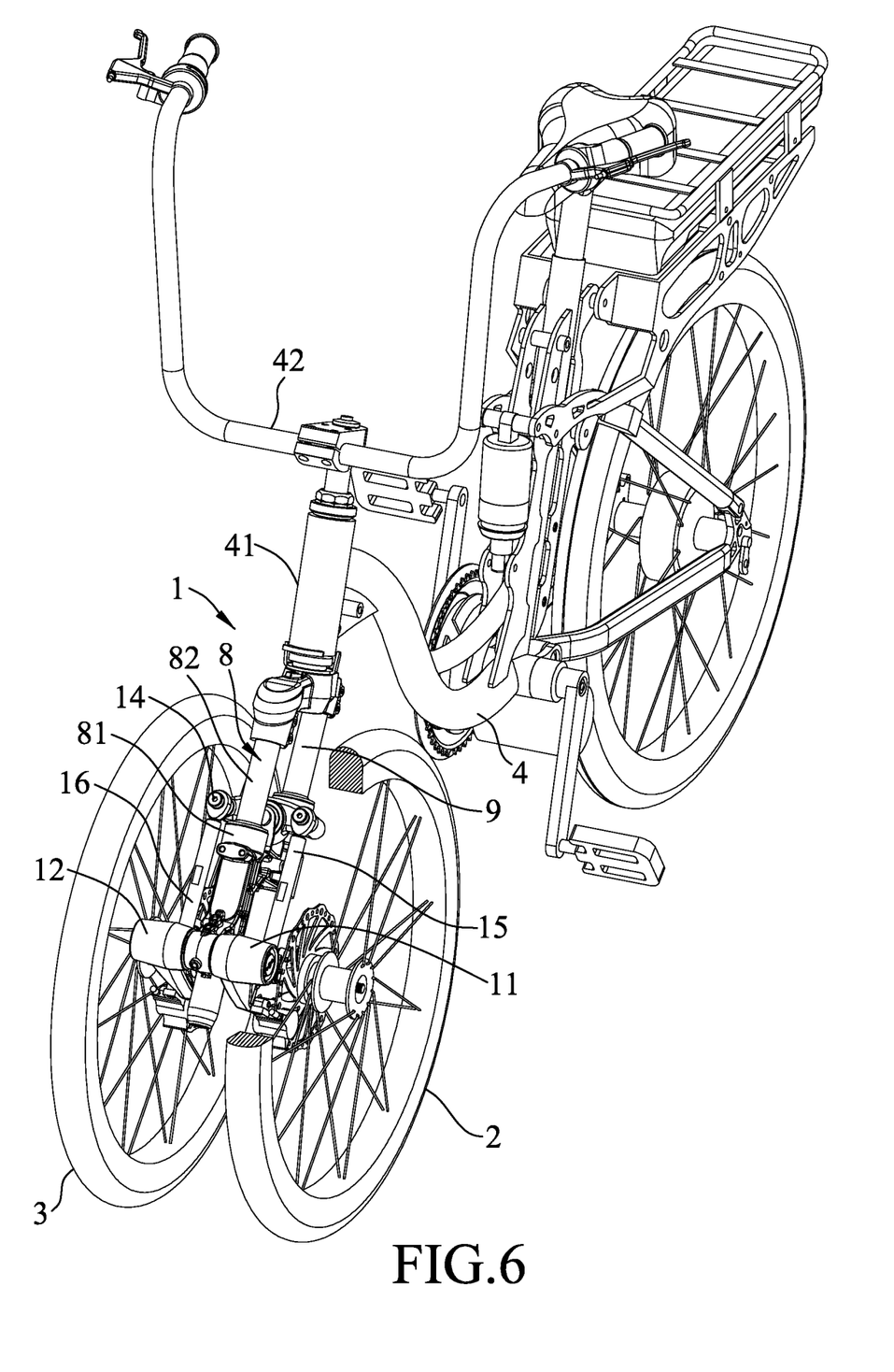
FIG. 6 is a fragmentary perspective view illustrating a second embodiment of a front fork assembly for a two front wheeled tilting vehicle according to the disclosure.
Figure 7A:
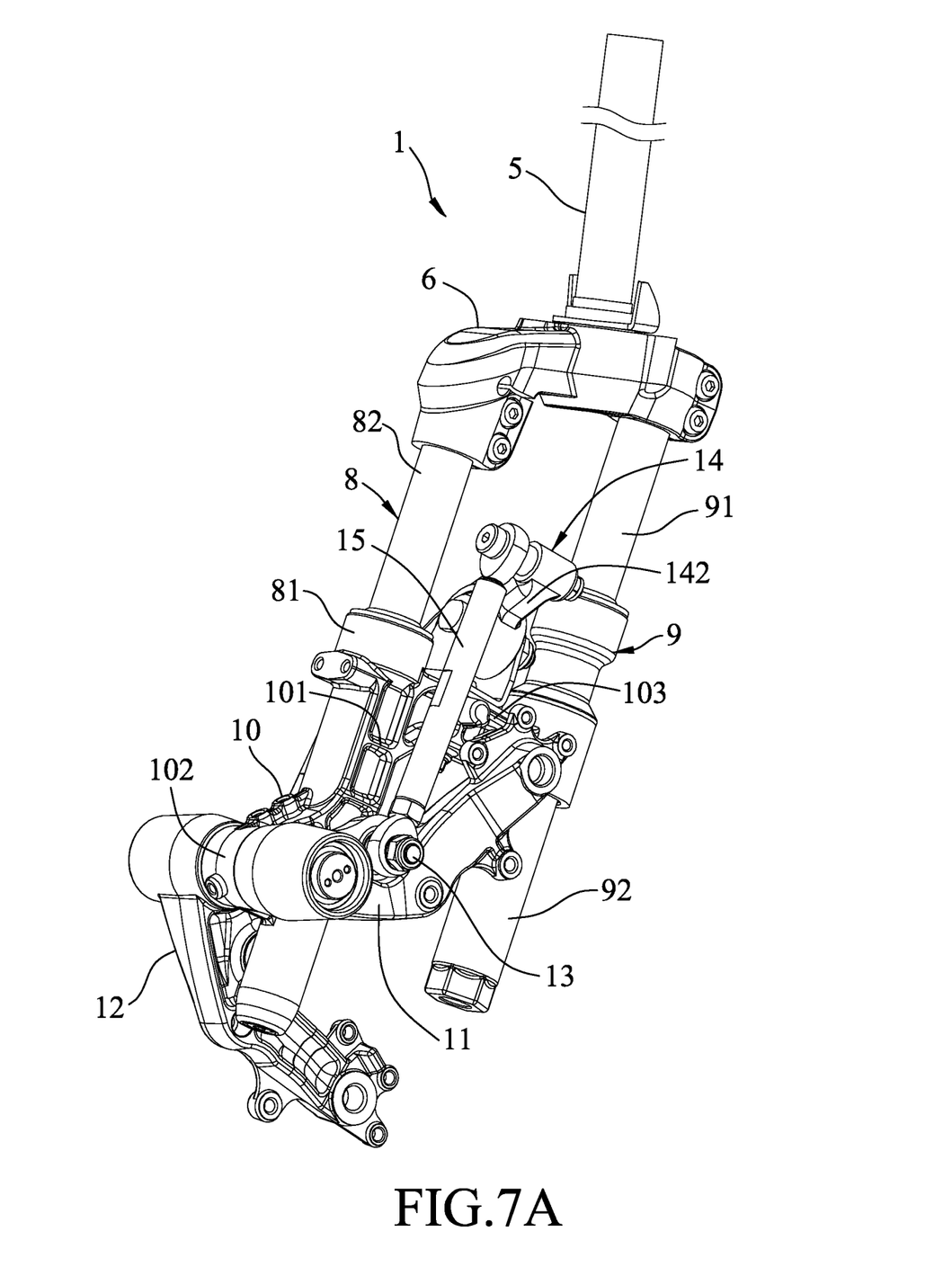
FIG. 7A is a perspective view of the second embodiment.
Figure 7B:
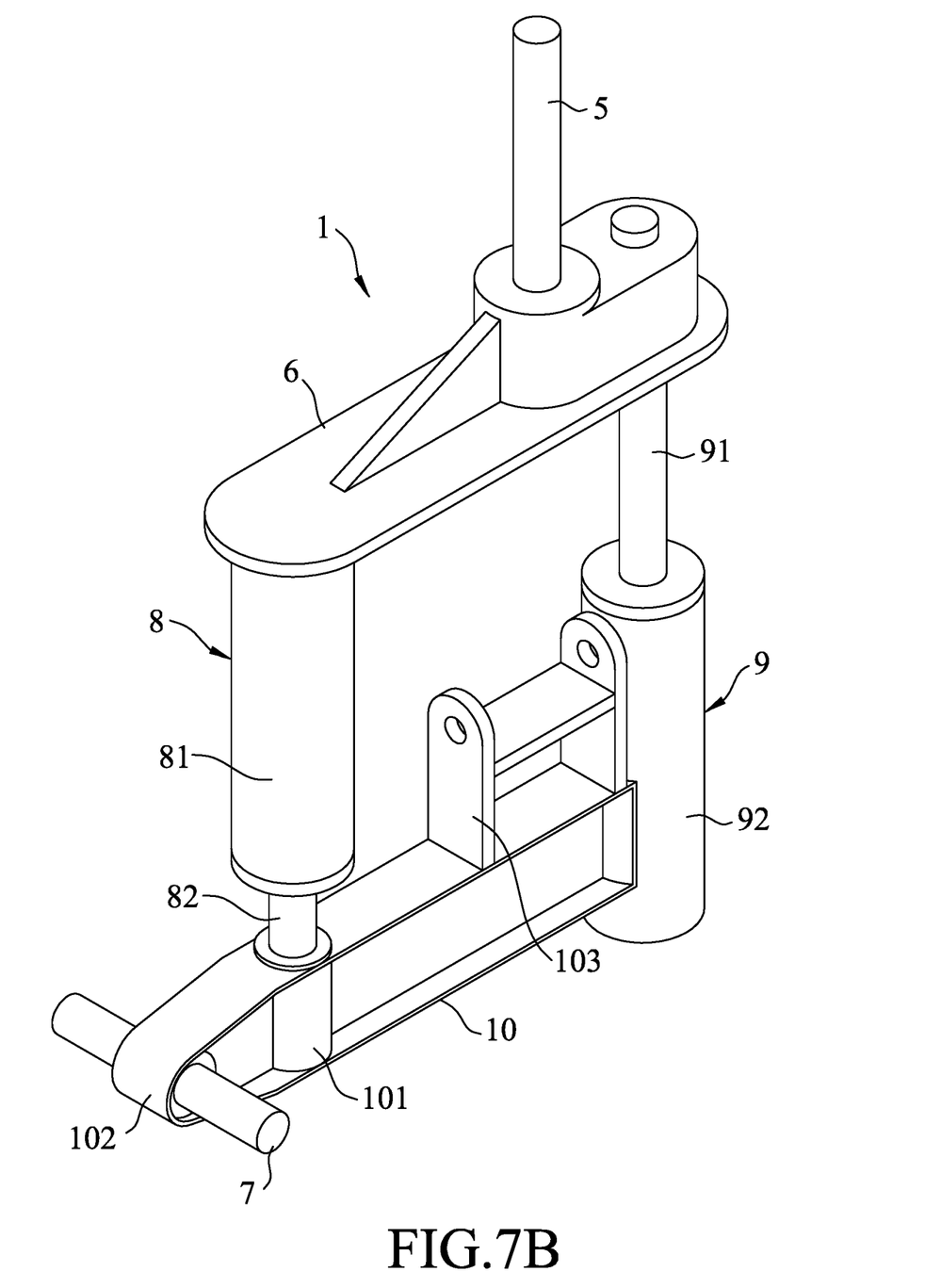
FIG. 7B is a perspective view of a portion of the second embodiment, wherein a shock absorbing assembly is in a modified form.
Figure 8:
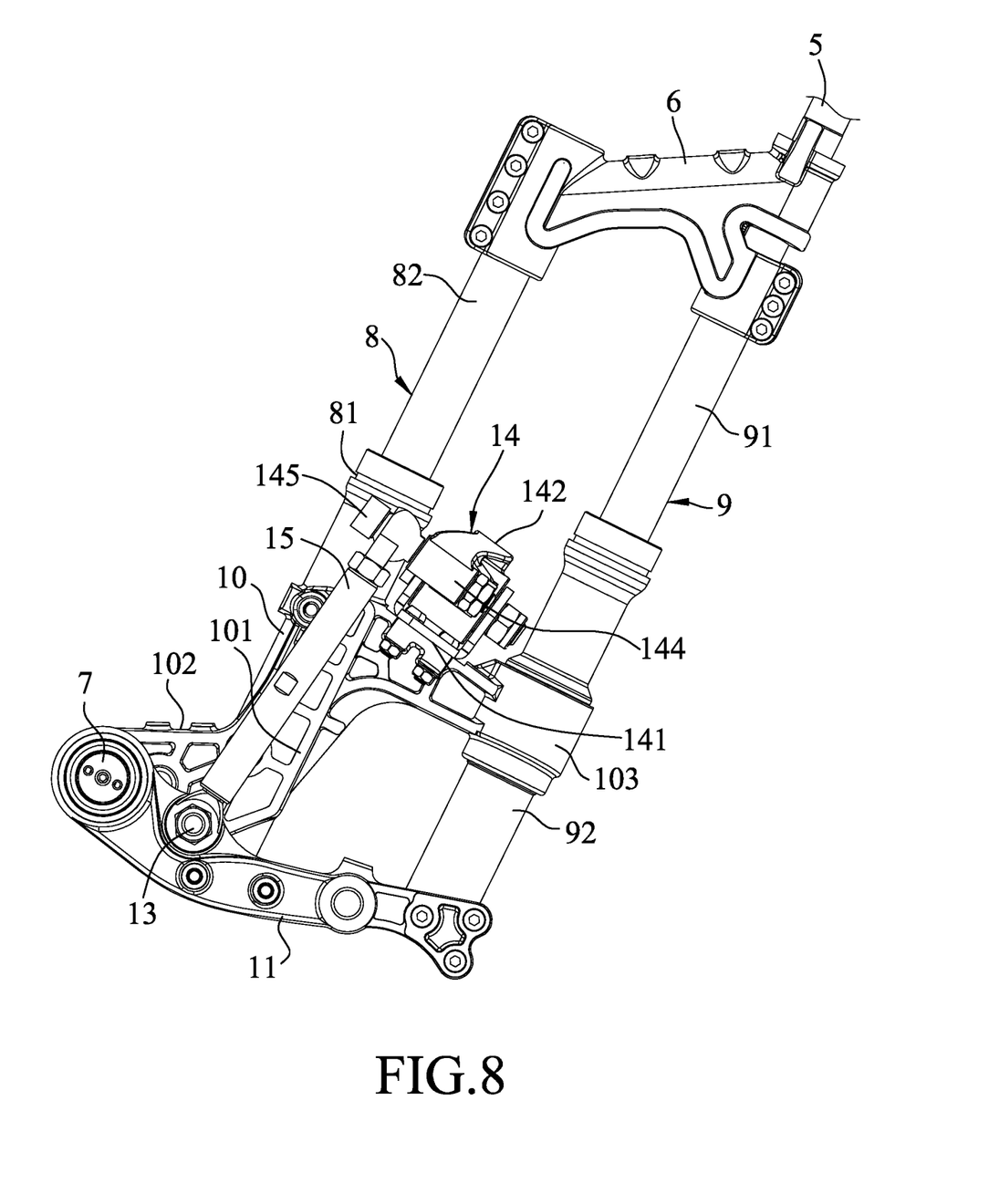
FIG. 8 is a fragmentary side view of the second embodiment.
Figure 9:
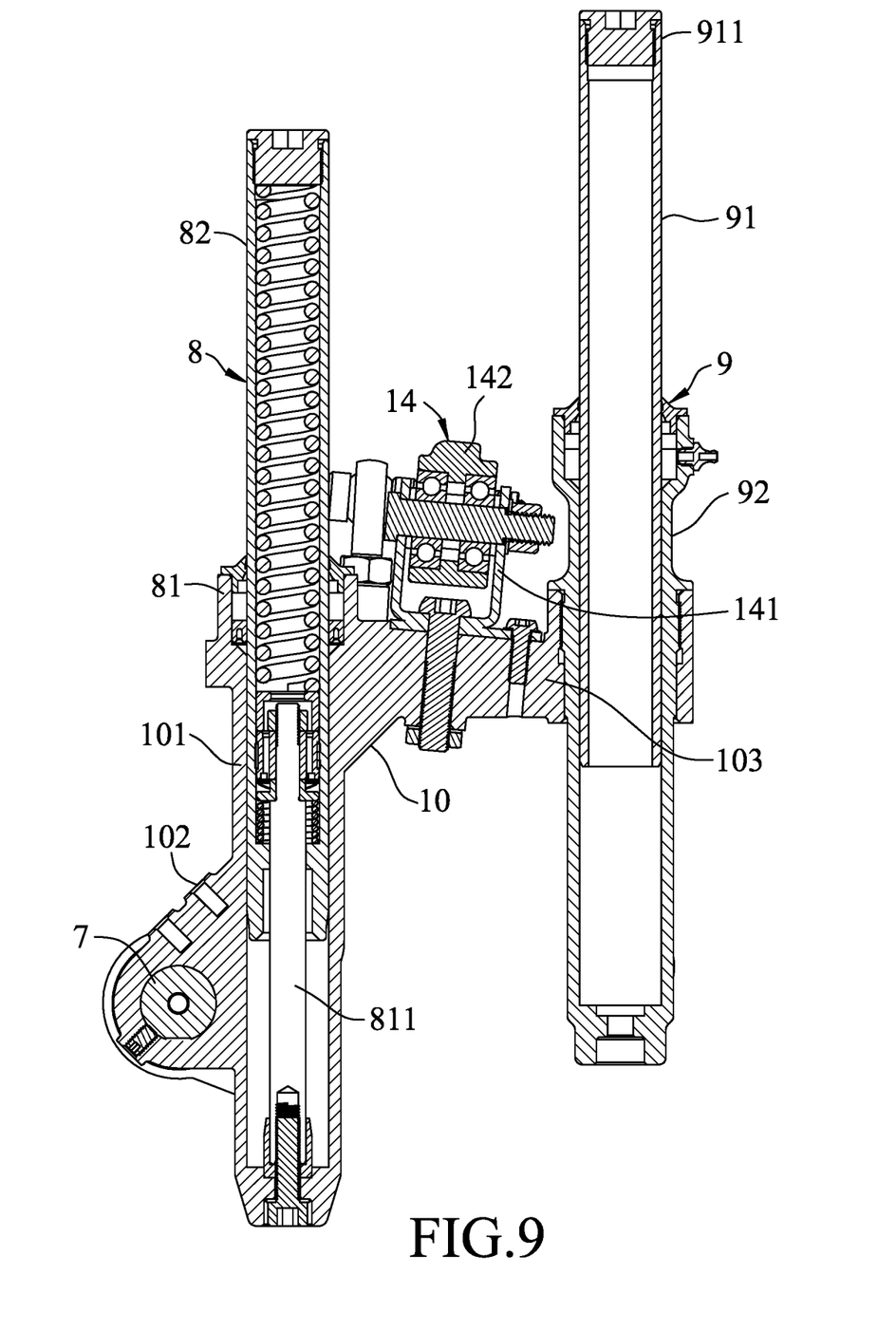
FIG. 9 is a sectional view of the second embodiment.

In a modified embodiment, referring to FIG. 7B, the shock absorbing assembly 8 includes the cylinder 81 having an upper end portion which is securely connected with the suspending bracket 6, and a lower end portion which is movably sleeved on the cylinder rod 82 and reciprocally and coaxially slidable along the cylinder rod 82 in the up-down direction. The cylinder rod 82 is securely connected with the connecting bridge 10. Thus, with guiding of the piston rod 82 and the guiding cylinder 92, the connecting bridge 10 is non-rotatably moved up and down so as to ensure the movement of the crank pivoting shaft 7 up and down without any undesired rotation.

Figure 10:
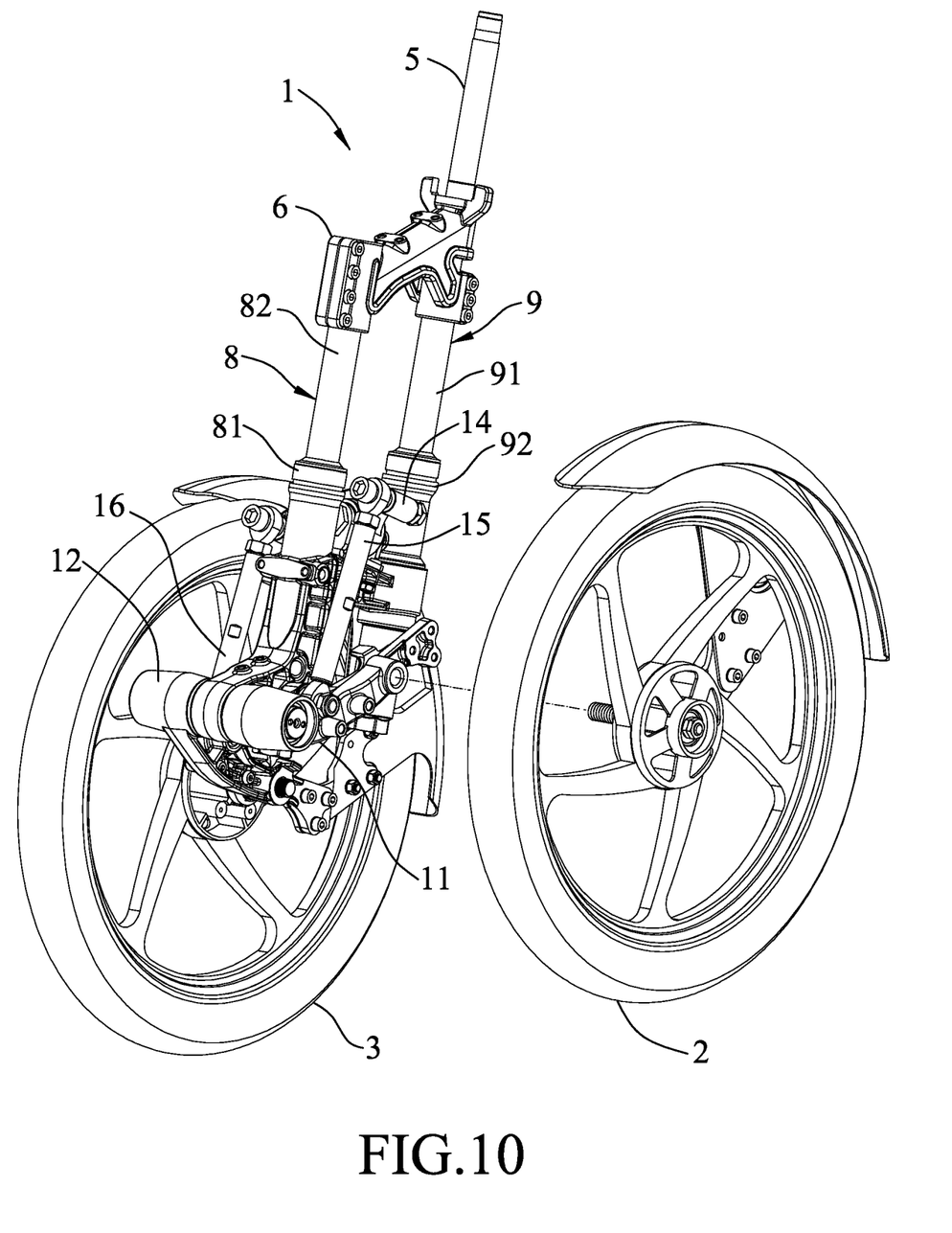
FIG. 10 is an exploded perspective view illustrating a third embodiment of a front fork assembly for a two front wheeled tilting vehicle according to the disclosure.
Figure 11:
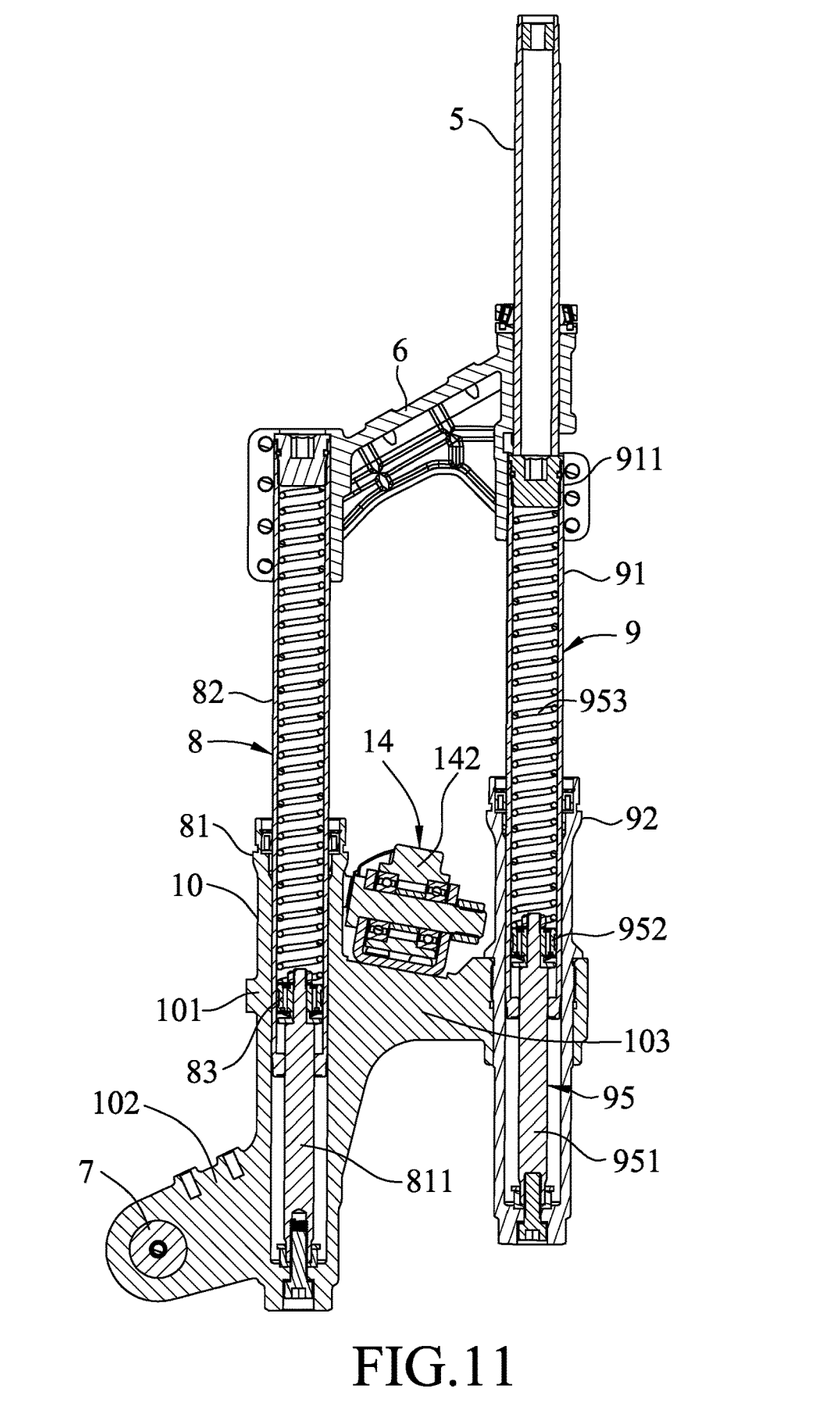
FIG. 11 is a sectional view of the third embodiment.

With reference to FIGS. 10 and 11, in a third embodiment, the shock absorbing assembly 8 further has a check damping valve 83 interposed between the cylinder rod 82 and the cylinder 81. Specifically, the check damping valve 83 is disposed within the cylinder rod 82 and securely connected with the lower end portion of the cylinder 81 by a valve stem 811. When the shock absorbing assembly 8 is compressed, the cylinder rod 82 is moved downwardly relative to the cylinder 81, and the valve opening function of the check damping valve 83 is triggered to allow the cylinder rod 82 move freely until it's stroke end, but, in the returning stroke of the cylinder rod 82, the damping function of the check damping valve 83 is triggered to retard the relative movement of the cylinder rod 82 and the cylinder 81 under designed coefficient of damping.

The anti-revolving guiding member 9 further includes a damping assembly 95 disposed within the guiding rod 91. As shown in FIG. 11, the damping assembly 95 has a piston stem 951 which is fixed to the guiding cylinder 92, a check damping valve 952 which is disposed in the guiding rod 91 and secured to an upper rod end portion of the piston stem 951, and a compression spring 953 which is disposed in the guiding rod 91 and which abuts against the fixed end 911 of the guiding rod 91 and the check damping valve 952 so as to vest the anti-revolving guiding member 9 with a shock-absorbing function. Alternatively, various air and fluid shock-absorbing and damping components commonly used in the market can also be used.

In this embodiment, the check damping valve 83 of the shock absorbing assembly 8 generates a damping action oriented to a direction which is the same as that of a damping action generated by the check damping valve 952 of the damping assembly 95. Alternatively, the check damping valve 83 of the shock absorbing assembly 8 may be disposed to generate a damping action oriented to a direction which is opposite to that of a damping action generated by the check damping valve 952 of the damping assembly 95.

The present invention may have two damping structures spaced apart from each other in the front-rear direction and each extending in the up-down direction to interconnect the suspending bracket 6 and the connecting bridge 10. In the case that there is resonance between the shock absorbing assembly 8 and the anti-revolving guiding member 9, only vibration of the front fork assembly 1 in the up-down direction occurs, rather than shaking in the left-right direction. Thus, occurrence of speed wobble on front wheels can be further avoided and minimized.

As illustrated, with the shock absorbing assembly 8 and the anti-revolving guiding member 9 which are spaced apart from each other in the front-rear direction and extend in the up-down direction to interconnect the suspending bracket 6 and the connecting bridge 10, with the left and right connecting levers 15, 16 interconnecting the swing arm assembly 14 and the crank pivoting shaft 7, and with the left and right cranks 11, 12 for mounting with the left and right front wheels 2, 3, when one or both of the left and right front wheels 2, 3 is/are subject to a force, the force is transmitted for force compensation through the swing end portions 144 of the swing arm body 142 to make even and balanced forces to the left and right front wheels 2, 3, and the force is transmitted to the shock absorbing assembly 8 through the swiveling center axial portion 143 of the swing arm body 142 for shock absorbing. With the single shock absorbing assembly 8, the problem of two shock absorbers which generate interaction, interference and resonance therebetween is avoided, and occurrence of speed wobble of the front fork assembly 1 is prevented. Moreover, as compared with the frame mechanism of the prior art, the front fork assembly 1 of this disclosure has an additional space such that it is convenient to further reduce the center distance between the front wheels 2, 3 so as to meet the product design requirements of vehicles with narrow wheel-span requirements and so as to reduce the manufacturing costs.

I claim:

1. A front fork assembly for mounting with a left front wheel and a right front wheel, pivotably connectable with a head tube of a vehicle frame, and connectable with a steer handle, said front fork assembly comprising:

an erect post for pivotably inserting into the head tube, and having an upper end portion for connecting with the steer handle;

a suspending bracket securely connected with a lower end portion of said erect post;

a shock absorbing assembly including a cylinder and a cylinder rod, one of said cylinder and said cylinder rod having an upper end portion which is securely connected with said suspending bracket, and a lower end portion which is movably connected with the other one of said cylinder and said cylinder rod and reciprocally and coaxially slidable in said other one of said cylinder and said cylinder rod in an up-down direction;

an anti-revolving guiding member having a fixed end which is connected to said suspending bracket, and a movable end which is disposed downwardly of said fixed end;

a connecting bridge connected with both said other one of said cylinder and said cylinder rod and said movable end of said anti-revolving guiding member for guiding said other one of said cylinder and said cylinder rod only to move axially relative to said one of said cylinder and said cylinder rod, and for restricting rotation of said cylinder relative to said cylinder rod;

a crank pivoting shaft disposed on said connecting bridge and extending in a left-right direction;

a left crank and a right crank respectively disposed at left and right sides of said shock absorbing assembly, each of said left crank and said right crank having a pivot end which is pivotally connected to a related end of said crank pivoting shaft, a wheel mounting end which is connectable with a respective one of the left front wheel and the right front wheel, and a force pivoting point which is interposed between said pivot end and said wheel mounting end;

a swing arm assembly including a swing arm body which extends in the left-right direction, said swing arm body having a swiveling center axial portion which extends in the front-rear direction and is pivotably connected to said connecting bridge to be synchronously moved with said shock absorbing assembly in the up-down direction, and two swing end portions which are respectively disposed at left and right sides of said swiveling center axial portion; and a left connecting lever and a right connecting lever, upper ends of said left connecting lever and said right connecting lever being respectively and pivotally connected to said swing end portions, lower ends of said left connecting lever and said right connecting lever being respectively and pivotally connected to said force pivoting points, wherein, once one of the left front wheel and the right front wheel is subject to a force, the force is transmitted through said swing arm body and said left and right connecting levers to make even and balanced forces to the left and right front wheels, and the force is transmitted to said shock absorbing assembly through said swiveling center axial portion of said swing arm body.

2. The front fork assembly as claimed in claim 1, wherein said connecting bridge has a sleeve portion which is fixed on and movable with said other one of said cylinder and said cylinder rod, a forward extending portion which extends forwardly from an end of said sleeve portion and through which said crank pivoting shaft extends in the left-right direction, and a rearward extending portion which extends rearwardly from an opposite end of said sleeve portion and which is pivotably connected with said movable end of said anti-revolving guiding member.

3. The front fork assembly as claimed in claim 2, wherein said anti-revolving guiding member includes a guiding cylinder and a guiding rod, said guiding cylinder being secured to said rearward extending portion of said connecting bridge, and extending in the up-down direction, said guiding rod having said fixed end which is secured on said suspending bracket, and a lower end portion which is inserted into said guiding cylinder and reciprocally and coaxially slidable in said guiding cylinder in the up-down direction, an axis of said guiding rod extending parallel to an axis of said cylinder rod, and being offset from an axis of said cylinder rod in the front-rear direction.

4. The front fork assembly as claimed in claim 3, wherein said anti-revolving guiding member includes a damping assembly disposed within said guiding rod.

5. The front fork assembly as claimed in claim 4, wherein said shock absorbing assembly includes a check damping valve interposed between said cylinder rod and said cylinder, said damping assembly having a piston stem which is fixed to said guiding cylinder, a check damping valve which is disposed in said guiding rod and secured to an upper rod end portion of said piston rod, and a compression spring which is disposed in said guiding rod and which abuts against said fixed end of said guiding rod and said check damping valve.

6. The front fork assembly as claimed in claim 5, wherein said check damping valve of said shock absorbing assembly generates a damping action oriented to a direction which is the same as that of a damping action generated by said check damping valve of said damping assembly.

7. The front fork assembly as claimed in claim 5, wherein said check damping valve of said shock absorbing assembly generates a damping action oriented to a direction which is opposite to that of a damping action generated by said check damping valve of said damping assembly.

8. The front fork assembly as claimed in claim 3, wherein said cylinder has said upper end portion which is securely connected with said suspending bracket, and a lower end portion which is movably sleeved on said cylinder rod and reciprocally and coaxially slidable along said cylinder rod in the up-down direction, said cylinder rod being securely connected with said connecting bridge.

9. The front fork assembly as claimed in claim 2, wherein said anti-revolving guiding member is in form of an air and fluid shock-absorbing and damping member.

10. The front fork assembly as claimed in claim 1, wherein said anti-revolving guiding member includes a movable linkage and a fixed linkage, said movable linkage having said movable end which is pivotably connected with said connecting bridge about a first axis in the left-right direction, and a joint end opposite to said movable end, said fixed linkage having said fixed end which is pivotably connected with said suspending bracket about a second axis in the left-right direction, and a joint end which is pivotably connected with said joint end of said movable linkage about a third axis in the left-right direction.

* * * * *